US008855117B2

(12) United States Patent
Sabhanatarajan et al.

(10) Patent No.: US 8,855,117 B2
(45) Date of Patent: Oct. 7, 2014

(54) SCALABLE MEDIA ACCESS CONTROL PROTOCOL SYNCHRONIZATION TECHNIQUES FOR FABRIC EXTENDER BASED EMULATED SWITCH DEPLOYMENTS

(75) Inventors: Karthikeyan Sabhanatarajan, San Francisco, CA (US); Pirabhu Raman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 115 days.

(21) Appl. No.: 13/569,224

(22) Filed: Aug. 8, 2012

(65) Prior Publication Data
US 2014/0044126 A1 Feb. 13, 2014

(51) Int. Cl.
H04L 12/28 (2006.01)

(52) U.S. Cl.
USPC ............................ 370/392; 370/389; 370/354

(58) Field of Classification Search
CPC . H04L 65/4076; H04L 49/201; H04L 49/351; H04L 49/00; H04L 49/10; H04L 49/253; H04L 45/16; H04L 45/22; H04L 45/00; H04L 45/48; H04L 45/10; H04L 45/24; H04L 45/38; H04L 45/42; H04L 45/44; H04L 45/50; H04L 45/54; H04L 45/586; H04L 45/74; H04L 12/4625; H04L 12/5689; H04L 29/06; H04L 29/1233; H04L 29/12367; H04L 29/12839; H04L 61/6022
USPC ............ 370/392, 397, 410, 413, 395.53, 400, 370/401, 217, 256, 390, 225, 228, 351, 369, 370/389; 709/230, 223
See application file for complete search history.

(56) References Cited

U.S. PATENT DOCUMENTS

| 4,884,263 | A  | * | 11/1989 | Suzuki .......................... 370/225 |
| 6,456,597 | B1 | * | 9/2002  | Bare ............................. 370/252 |
| 7,512,122 | B1 | * | 3/2009  | Olakangil et al. ............ 370/389 |
| 8,593,987 | B2 | * | 11/2013 | Kuo et al. ..................... 370/252 |
| 2005/0213582 | A1 | * | 9/2005 | Wakumoto et al. ......... 370/395.3 |
| 2006/0155853 | A1 | * | 7/2006 | Nesz et al. .................... 709/227 |
| 2008/0247395 | A1 | * | 10/2008 | Hazard ......................... 370/392 |
| 2010/0302952 | A1 | * | 12/2010 | Hoshi ........................... 370/250 |

OTHER PUBLICATIONS

CISCO, "Cisco FabricPath for Cisco Nexus 7000 Series Switches," White Paper, Version 1.0, Sep. 7, 2011, pp. 1-44.*

* cited by examiner

*Primary Examiner* — Benjamin H Elliott, IV
*Assistant Examiner* — Eric Nowlin
(74) *Attorney, Agent, or Firm* — Edell, Shapiro & Finnan, LLC

(57) ABSTRACT

Techniques are provided to prevent switches in a data center fabric path environment with fabric path extension devices from media access control (MAC) address flooding and MAC address table overflow. In such an environment, endpoints associated with virtual port channels are connected to multiple switches which normally would perform MAC address flooding across all switch forwarding engines. The switches in the fabric path exchange MAC synchronization messages based on source/destination specific connectivity such that MAC broadcast messages that advertise source/destination MAC addresses for endpoints do not have to be repeatedly sent and their corresponding MAC lookup tables do not have to be updated or include unnecessary MAC table entries.

20 Claims, 5 Drawing Sheets

US 8,855,117 B2

SCALABLE MEDIA ACCESS CONTROL PROTOCOL SYNCHRONIZATION TECHNIQUES FOR FABRIC EXTENDER BASED EMULATED SWITCH DEPLOYMENTS

TECHNICAL FIELD

The present disclosure relates to improving performance in data center networks with Top of the Rack (ToR) emulated switch deployments.

BACKGROUND

Datacenter Ethernet (DCE) is an architectural collection of Ethernet extensions designed to improve Ethernet networking and management in the data center. Multi-pathing and full bisectional bandwidth are some of the major advantages of DCE. Cisco Fabric Path (FP) and the counterpart Internet Engineering Task Force (IETF) Transparent Interconnect of Lots of Links (TRILL) standard are some of the commonly deployed DCE technologies. A fabric extender (FEX) is a Top of the Rack switch to which datacenter servers are connected. FEXes are simple devices that do not incorporate any switching or routing. They act as remote line cards for their parent switches thereby simplifying datacenter management.

Recent deployments support datacenter technologies all the way to the host server level, thereby making the end hosts DCE capable. To further improve the data center and provide multi-chassis redundancy, emulated switches (e.g., a virtual port channel (VPC)) are supported with FEX devices. Emulated switches correspond to two or more underlying peer link switches, e.g., server hosts, in the layer 2 multipath (LAMP) network, while the FEX devices extend the available number of network ports for a supervisory switch, e.g., a switch at the data center access layer. To provide redundancy, two switches may be employed to alleviate problems associated with failures. These two switches are referred to as "peer" switches. To ensure consistency and redundancy, the peer switches exchange source and destination address information for their respective network communication flows. However, with the use of emulated switches and FEX devices, the number of source and destination addresses to be shared may increase to an unmanageable level, and thus traditional address sharing mechanisms do not scale well. In addition, many of the large number of addresses may not be used, thereby wasting expensive look up table resources.

DESCRIPTION OF EXAMPLE EMBODIMENTS

Overview

Techniques are provided for a first switch to receive from a first endpoint a unicast packet destined for a second endpoint. Addresses identifying the first and second endpoints are extracted from the unicast packet. Information representing the address of the first endpoint and the address of the second endpoint is stored. A broadcast DCE packet is received from a second switch, comprising information indicating that network traffic is being sent from the second endpoint to the first endpoint by way of the second switch. An address associated with each of the first and second endpoints is extracted from the broadcast packet. A determination is made as to whether the address of the first endpoint extracted from the unicast packet matches the address of the first endpoint extracted from the broadcast packet and whether the address of the second endpoint extracted from the unicast packet matches the address of the second endpoint extracted from the broadcast packet. A DCE packet contains Inner MAC addresses corresponding to classical Ethernet and outer MAC addresses corresponding to Data Center Ethernet (DCE). When the addresses of the first and second endpoints match, a message is sent from the first switch to the second switch, the message comprising information configured to prevent the second switch from sending future broadcast packets indicating that network traffic is being sent from the second endpoint to the first endpoint.

Example Embodiments

Figure 1:
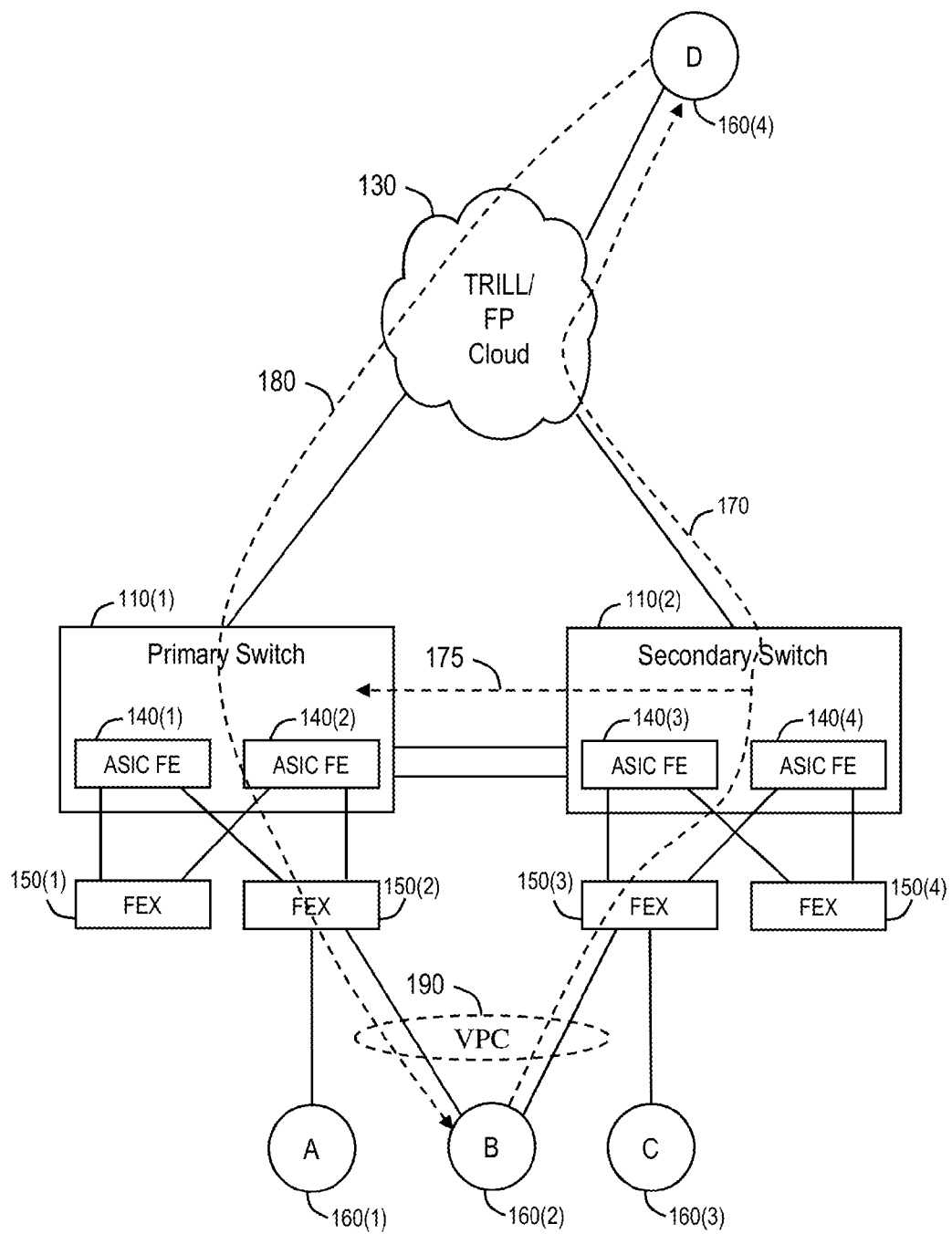
FIG. 1 is an example of a block diagram of a multipath network environment where switches are configured to generate Media Access Control (MAC) protocol layer synchronization packets in order to prevent peer switch flooding according to the techniques described herein.

Referring first to FIG. 1, an example of a multipath network is shown at reference numeral 100. The network 100 has a primary switch 110(1), a secondary switch 110(2), four fabric extenders (FEXs) 150(1)-150(4), a plurality of endpoints or hosts 160(1)-160(4), and a network 130. The network 130 is, for example, a DCE network or a network that employs the TRILL protocol within the Fabric Path (FP). The TRILL protocol is an IETF Protocol implemented by devices that may be referred to as router bridges. To this end, switches 110(1) and 110(2) may act as router bridges in the simplified example network topology shown in FIG. 1, and may be considered as "peers" since they provide backup redundancy for each other and VPC supported hosts. Additional switches may also be employed in network 130. Switches that are internal to the FP may be referred to as "core" switches and switches that are on the edge of the FP may be referred to as "edge" switches. Similarly, any internal ports or ports facing into the FP may be referred to as "core" ports, while ports facing away from the FP may be referred to as "edge" ports. It should be understood that a real-world multipath network would have a much larger number of switches than those shown in FIG. 1. The number of switches shown in FIG. 1 is only by way of a simplified example for purposes of this disclosure.

Each of the edge switches 110(1) and 110(2) includes application specific integrated circuits (ASICs) that act as forwarding engines (FEs), shown as ASIC FEs 140(1)-140(4), for traffic exchanges between endpoints 160(1)-160(4) that are referred to herein by their corresponding letter label, e.g., letters A-D as shown in FIG. 1. Each FE may support hundreds of ports with each port having stored destination MAC address (DMAC) forwarding information, as will be described later. When MAC synchronization is employed, each FE may have to store DMAC entries for peer switch FEs. This leads to potentially thousands of DMAC entries, most of which may never be used.

In this example, endpoint B at 160(2) is in network communication with endpoint D at 160(4) via directional communication paths 170 and 180. Endpoints A and C, at 160(1) and 160(3) respectively, are stand-alone hosts while endpoint B is a host server connected in VPC topology. As such, endpoint B is coupled to both edge switches 110(1) and 110(2). The dual connection is facilitated by VPC 190. A VPC allows links that are physically connected to two different switches to appear as a single port channel to a third device, e.g., one of FEXs 150(2) and 150(3). In this regard, the third device can be another switch, server, or any other networking device, e.g., endpoint D. VPCs provide Layer 2 multipath forwarding, which allows network administrators to create redundancy by increasing bandwidth, enabling multiple parallel paths between nodes and load balancing traffic where alternative paths exist. Accordingly, by way of VPC 190, switches 110(1) and 110(2) can provide redundant communication paths for endpoint B.

Endpoints A-D communication by way of classical Ethernet (CE) using standard CE frames. The simplified content of the frame includes a DMAC, a source MAC address (SMAC) and a payload, e.g., using this format: {DMAC, SMAC, payload}. If the CE frame is part of a Virtual Local Area Network (VLAN), then the CE frame may include a VLAN identifier (ID) (VLAN ID), and use this format: {DMAC, SMAC, VLAN ID, payload}. The DMAC is the destination CE node's MAC address and the SMAC is the source CE node's MAC address. Once a CE frame enters the FP it is encapsulated using a FP header. The FP header includes an FP source address (SA) and an FP destination address (DA). The DA is the destination FP node's FP address and the SA is the source FP node's FP address. The resulting FP frame has the following format: {DA, SA, DMAC, SMAC, payload}.

For purposes of this description, it can be assumed that endpoints A and D are already in communication or otherwise in a "conversation." As a result, primary switch 110(1) learns the MAC addresses of endpoints A and D and stores them in a packet forwarding lookup table for use by an ASIC FE. The packet forwarding table for switch 110(1) is shown in Table 1 below:

TABLE 1

Example forwarding table for switch 110(1)

| DMAC | VLAN ID | DA | Port |
|---|---|---|---|
| MAC A | 1 | Local Port | 6 |
| MAC D | 1 | 2.1.ff | 8 |

Table 1 indicates that switch 110(1) knows the addresses of endpoints A and D. When a packet arrives at switch 110(1) with a DMAC for endpoint A and a VLAN ID of 1, the packet is forwarded to endpoint A via port 6 after removing the FP header (if any). When a packet arrives at switch 110(1) with a DMAC for endpoint D and a VLAN ID of 1, the packet is forwarded to endpoint D via port 8 after adding the FP header.

In traditional CE environments, the secondary switch 110(2) would also learn about MAC address D, thereby using up space in the forwarding lookup table. In a datacenter environment, in order to keep the MAC table from filling up quickly, a technique called conversational MAC learning is employed using the techniques described herein. In this example, D is learned only by switch 110(1), i.e., the switch facilitating the active conversation via path 180. Since A is a standalone host, there is no need to synchronize the MAC address with switch 110(2).

At this point, endpoint B starts sending packets to endpoint D by way of VPC 190. If the flow from B to D gets hashed via switch 110(2), switch 110(2) broadcasts the packets to network 130 and the address of endpoint B is learned and stored in switch 110(2). The broadcast through network 130 may be accomplished using a DA of all 1's, e.g., FFFF:FFFF:FFFF hexadecimal. The packets are forwarded to endpoint D and broadcast link 170 is established. Since B is a VPC host, switch 110(2) synchronizes the MAC address of endpoint B with switch 110(1). Upon exiting the FP network 130, the FP frame is stripped of its FP header and the underlying CE frame is forwarded to endpoint D. When endpoint D sends packets into the TRILL/FP cloud 130 back to endpoint B, the packets will be unicast CE packets since the MAC address of node B is known to endpoint D by virtue of the SMAC address of endpoint B contained in the CE frame. The unicast packet can reach B either via route 180 or route 170. If route 180 is selected, D is already known to switch 110(1) as a result of the conversation between A and D, and the packet is forwarded to switch B. Since the packet from D to B was a unicast packet, D's MAC address is never synchronized from switch 110(1) to switch 110(2). As a result, packets from endpoint B to endpoint D are in broadcast form, and packets from endpoint D to endpoint B are in unicast form.

In traditional networks, MAC addresses for network traffic with respect to endpoint B are broadcast to all adjacent nodes. Every modern network ASIC has a forwarding engine or MAC address table where the newly learned MAC addresses are stored. As a result, each of the ASIC FEs learn of each others' forwarding MAC addresses. For example, when endpoint A sends an Address Resolution Protocol message, all the FEs learn A's MAC address from the ARP broadcast.

In this example, FEs 140(3) and 140(4) will flood addresses to FEs 140(1) and 140(2) (and vice versa) using MAC synchronization messages that are sent at 175. However, as described above and by virtue of the given communications sessions between endpoints B and D, the unicast packets from endpoint D to endpoint B will always travel along path 180 and by virtue of being unicast will not be flooded across ASIC FEs. The multicast packets from B to D will always be sent along path 170 for all conversations between these endpoints, and FEs 140(3) and 140(4) will thereafter always flood FEs 140(1) and 140(2) using messages 175. Traditional approaches solve this flooding problem typically share or synchronize all MAC addresses across all FEs, e.g., FE 140(1) will carry all of the MAC lookup table entries for FEs 140(1)-140(4). Accordingly, using the traditional approach of pro-active MAC synchronization, FEs 140(3) and 140(4) will already know that FE 140(1) or 140(2) already has the MAC addresses of endpoints B and D and will not send flood messages 175 with respect to these endpoints.

Traditional pro-active MAC synchronization has a couple of problems. First, because pro-active MAC synchronization shares all MAC addresses for all server (VPC) hosts, the MAC address table fills up very quickly with irrelevant MAC entries. Second, pro-active MAC synchronization does not scale with increasingly complex data center implementations, e.g., as the number of connections (ports) increase, the MAC table entries increase proportionately whether or not the FE is facilitating a conversation with a particular endpoint, as will be described in connection with FIG. 2.

To prevent the unnecessary use of resources the techniques described herein implement a new messaging scheme to prevent the waste of network resources. For example, by virtue of the techniques provided herein that do not use pro-active MAC synchronization, switch 110(1) will receive messages 175 and "recognize" that it already "knows" the addresses of endpoints B and D by way of the communication path 180, and the switch 110(1) therefore determines that repeatedly sending messages 175 is unnecessary. To prevent unnecessary flooding, switch 110(1) will send a message to switch 110(2) to prevent flooding as is described below.

Figure 2:
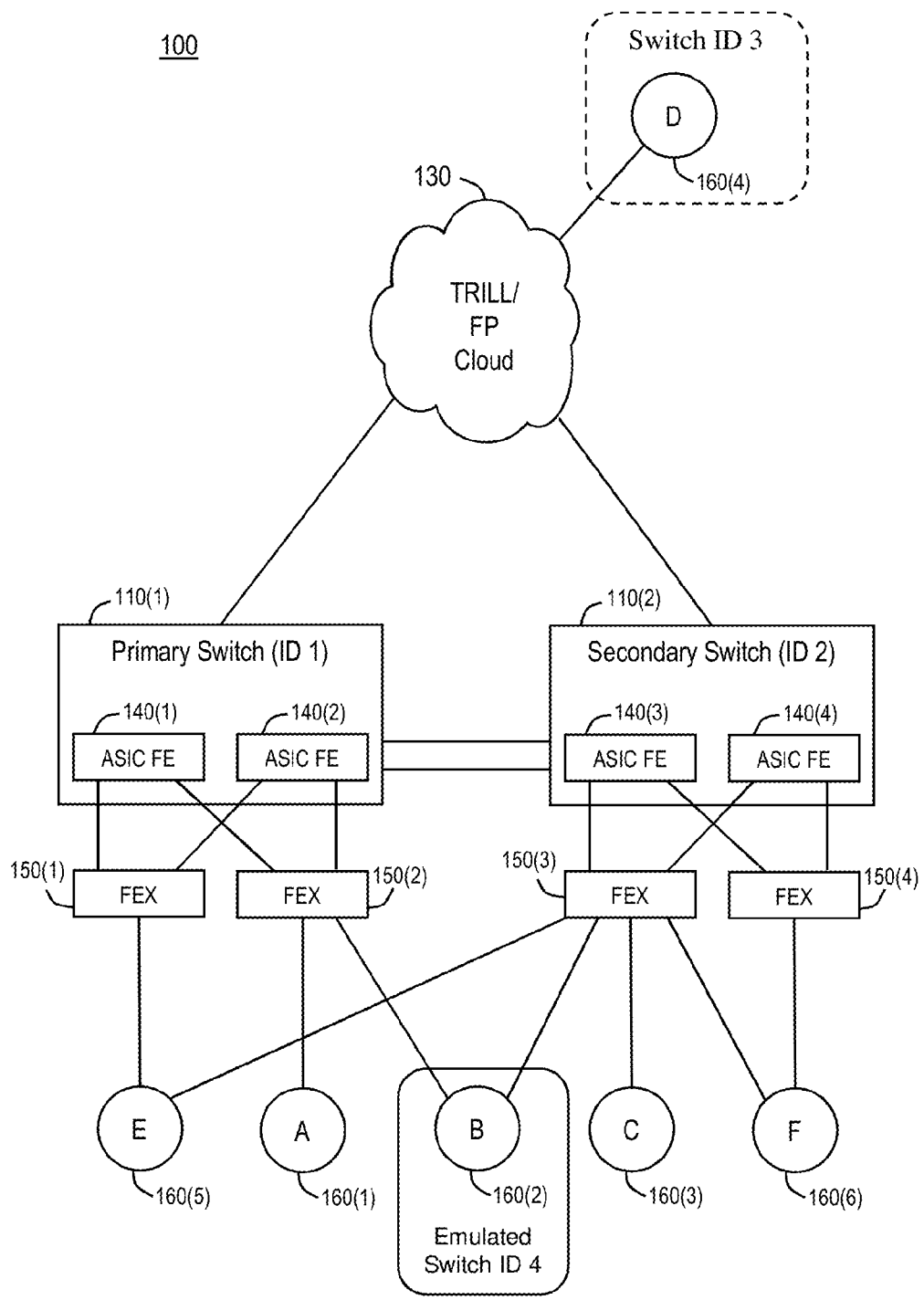
FIG. 2 is an example of a block diagram of the network from FIG. 1 with additional host endpoints configured as emulated switches.

Referring to FIG. 2, the network from FIG. 1 is shown with additional host endpoints E and F at reference numerals 160(5) and 160(6), respectively. Endpoint E is connected to FEXs 150(1) and 150(3) and endpoint F is connected to FEXs 150(3) and 150(4). Each of the ASIC FEs 140(1)-140(4) traditionally has a binary multiple number of network ports, e.g., 2, 4, or 8. Furthermore, each FEX may be equipped with up to 48 or more ports that connect to host servers and 4 ports that can be coupled to the switches, and as such provide a simplified distribution point between switches and servers. Assuming each of FEs 140(1)-140(4) has four ports that can each be connected to an FEX, then each FE may have to support 192 ports (4 FE ports×48 FEX ports) and the associated flows for each of these ports. Traditionally there are at least 8 to 12 Forwarding Engines (FEs) in a line card in the switch. Accordingly, as the number of FEs and FEXs increase, the traditional pro-active MAC synchronization method becomes unmanageable without increasing lookup table resources in the hardware.

In order to provide a more scalable solution, the techniques described herein allow FEs to engage in MAC learning for only those conversations that are active and pertinent to an FE that is supporting multiple connections for a server host, e.g., by way of a VPC. MAC addresses for stand alone hosts are not shared between switches 110(1) and 110(2). In this example, endpoints A, E, and F are coupled to multiple FEXs. Accordingly, only MAC addresses for active connections for endpoints are shared between FEs that have corresponding VPC legs (connections).

Switches, emulated switches, and endpoints across the TRILL/FP cloud are assigned an identifier. In this example, primary switch 110(1) is assigned an identifier (ID) of one (1), secondary switch 110(2) is assigned an ID of two (2), endpoint D is assigned an ID of three (3), and endpoint B is assigned an emulated ID of four (4). Destination switch IDs are used by the FEs to make forwarding decisions and may be included in the FP DA. When configuring a VPC, e.g. VPC 190 for node B, the operator configures the switch ports attached to node B as core ports, as opposed to edge ports. Using the core configuration essentially makes node B part of the FP network. As such, the core port configuration needs a switch ID to identify to the edge switch which switch is at the other end of the port in order to make forwarding decisions. In this example, the network administrator has assigned an ID of 4 to endpoint B. Since endpoint B is not actually part of the FP network it is referred to as an emulated switch by virtue of being connected to core configured ports. The use of switch IDs will be further described in connection with FIGS. 3 and 4.

Figure 3:
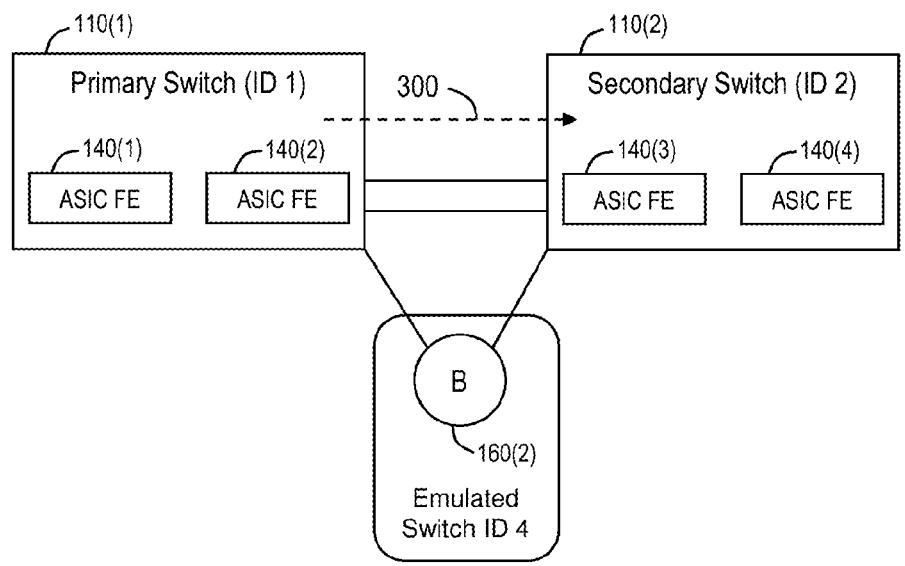
FIG. 3 is an example of a block diagram of the switches from FIG. 1 where a primary switch is configured to send a synchronization packet to a secondary switch in order to prevent the secondary switch from flooding.

Turning to FIG. 3, an example of a block diagram of the switches from FIG. 1 is shown where the primary switch is configured to send a synchronization packet to the secondary switch in order to prevent secondary switch from flooding. Any peer switch may exchange these messages. When switch 110(1) receives flooding messages, e.g., messages 175 (FIG. 1), the switch 110(1) will send message 300 to switch 110(2) to prevent further flooding. When switch 110(1) receives flooding messages, the switch will compare information in the flood packet with information in its forwarding table, e.g., a MAC lookup table. When the SMAC and DMAC of the message matches MAC table entries for that particular FE, switch 110(1) will send a synchronization message 300 to switch 110(2). The sending of the message may be further restricted by limiting the synchronization message 300 to those entries that correspond to emulated switches, e.g., those servers associated with a VPC.

The message 300 contains the matching MAC addresses and may also contain the switch ID. Accordingly, the message may be in a {SMAC, DMAC, switch ID} format. The logic for reactive or conversational MAC learning may be implemented in software, hardware, or a combination of both software and hardware. The software solution may send message 300 by way of an interrupt, e.g., using an interrupt service routine (ISR). A layer 2 forwarding manager (L2FM) or other software component ISR, services the interrupt by syncing the destination MAC to the corresponding FEs of the peer switch. Once an interrupt is initiated further interrupts are masked or inhibited until the ISR is complete. Software solutions, due to latency, may take longer than hardware solutions to converge to a stable synchronization configuration, but may be easier to implement without replacing existing ASIC FEs.

When implemented in hardware the message 300 may be internal peer-to-peer packets that can be sent to the adjacent peer switch, e.g., using a peer-to-peer switch specific communications link that is used in data centers to provide switch redundancy. The synchronization message 300 may be flooded to each ASIC FE in the peer switch. Such synchronization messages are sent only for hosts behind an emulated switch, which is identified by a special bit called Assigned Switch (AS) bit. When a flood packet is received for a flow which is already known to the FE, then synchronization message 300 is sent. Thus, when an FE has an SMAC address and a DMAC address match, the outer destination address is a broadcast address, and the AS flag is set, the synchronization message is sent to all the FEs in the peer switch. When the peer FEs receive this message, they perform an SMAC lookup. If the FEs obtain an SMAC match, the DMAC address is learned by the FE.

When a frame enters the FP network from a Classical Ethernet (CE) network, the ingressing interfaces encapsulate the frame with an FP header. The FP control plane software builds paths, called trees, through the FP network and assigns an FTag on a flow basis to all the traffic in the FP network. When the frame leaves the FP network to go to a CE network, the egressing interface decapsulates the frame and leaves the regular CE header. The FP network uses the Layer 2 Intermediate System-to-Intermediate System (IS-IS) protocol to forward traffic in the network using the FP headers. Layer 2 IS-IS allows all switches to have the same view of all the trees built by the software. For multi-direction traffic, such as unknown unicast, multicast, and broadcast traffic, the tree path is used only to avoid packet looping. The FTag ensures that all switches forward packets on the same tree across the network, even though FP supports multiple trees.

Figure 4:
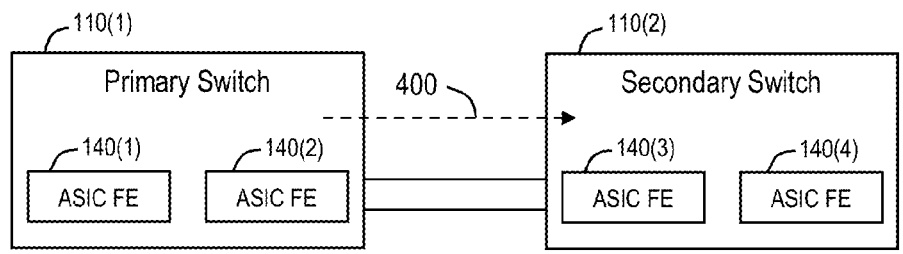
FIG. 4 is an example of a block diagram of the switches from FIG. 1 where the primary switch is configured to send a purge packet to the secondary switch in order to allow the secondary switch to restart flooding.

Referring to FIG. 4, an example of a block diagram of the switches from FIG. 1 is shown where the primary switch is configured to send a purge packet 400 to the secondary switch in order to allow the secondary switch to restart flooding. In some implementations, the destination endpoint relative to the data center servers may move and be subsequently coupled to a new source pathway. For example, endpoint D may be associated with an end user with a mobile device that uses services provided by data center server endpoints A, B, C, E, and or F. Thus, endpoint D may login from various networks and the communication pathway will change as a result. When switch, e.g., primary switch 110(1), detects that endpoint D has moved or that the connection to endpoint D has timed out, switch 110(1) will send message 400 that will allow secondary switch 110(2) to restart flooding with respect to endpoint D. Message 400 may contain information similar to message 300 along with the appropriate purge indications.

Figure 5:
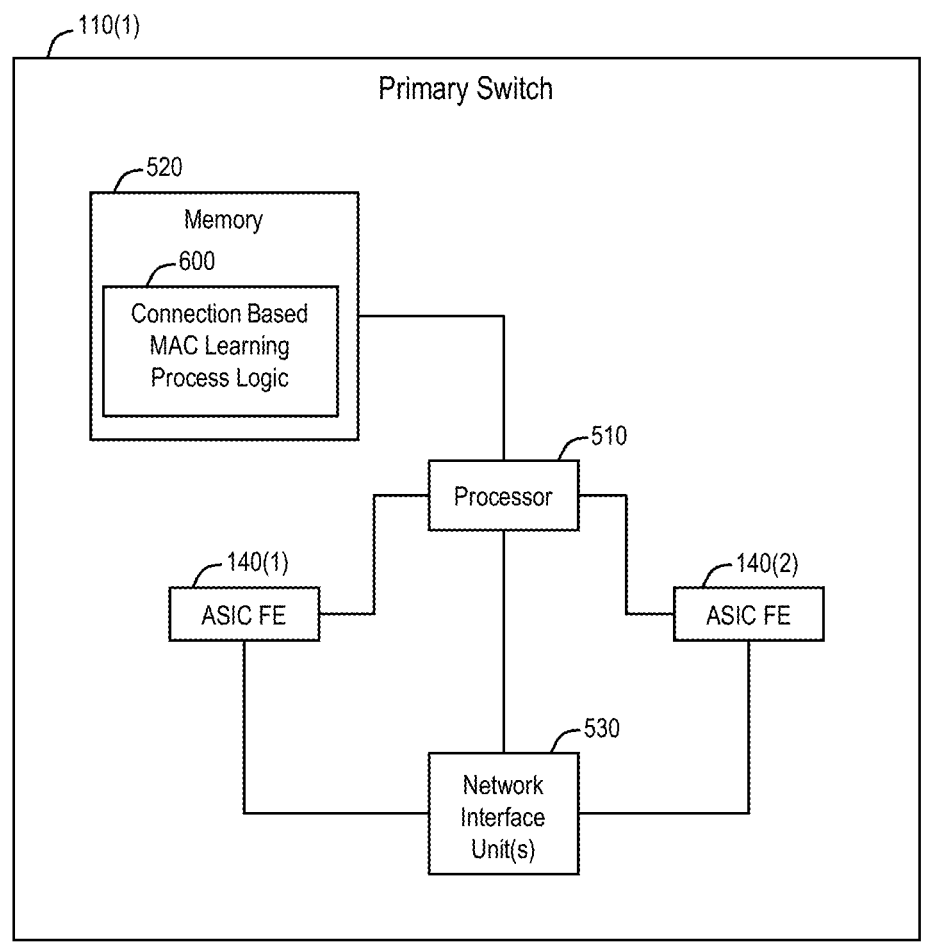
FIG. 5 is an example of a block diagram of a switch that is configured to send synchronization and purge packets.

Turning now to FIG. 5, an example of a block diagram of a switch that is configured to generate probe packets is now described. The diagram of FIG. 5 is representative of the general structure of any of the switches shown in FIG. 1. Each switch comprises a processor 510, memory 520, routing circuitry in the form of ASIC FEs 140(1) and 140(2), and a network interface device(s) or unit(s) 530 (e.g., Ethernet line card). The routing circuitry is, in some examples, implemented by digital logic gates and related circuitry in an ASIC, and is configured to route packets through a network using a variety of protocols, such as the TRILL protocol referred to above. The network interface device 530 sends packets from the switch to the network and receives packets from the network that are sent to the switch. The processor 510 is, for example, a microprocessor, microcontroller, digital signal processor or other similar data processor configured for embedded applications in a switch.

The memory 520 may comprise read only memory (ROM), random access memory (RAM), magnetic disk storage media devices, optical storage media devices, flash memory devices, electrical, optical, or other physical/tangible (non-transitory) memory storage devices. The memory 520 stores executable software instructions for connection based MAC learning process logic 600 that is described in connection with FIG. 6. Thus, the memory 520 may comprise one or more computer readable storage media encoded with software comprising computer executable instructions and when the software is executed operable to perform the operations described herein for the process logic 600. The processor 510 executes the process logic 600 in order to generate and send synchronization messages to peer switches, such as switches 110(1) and 110(2) in network 100 shown in FIG. 1.

Figure 6:
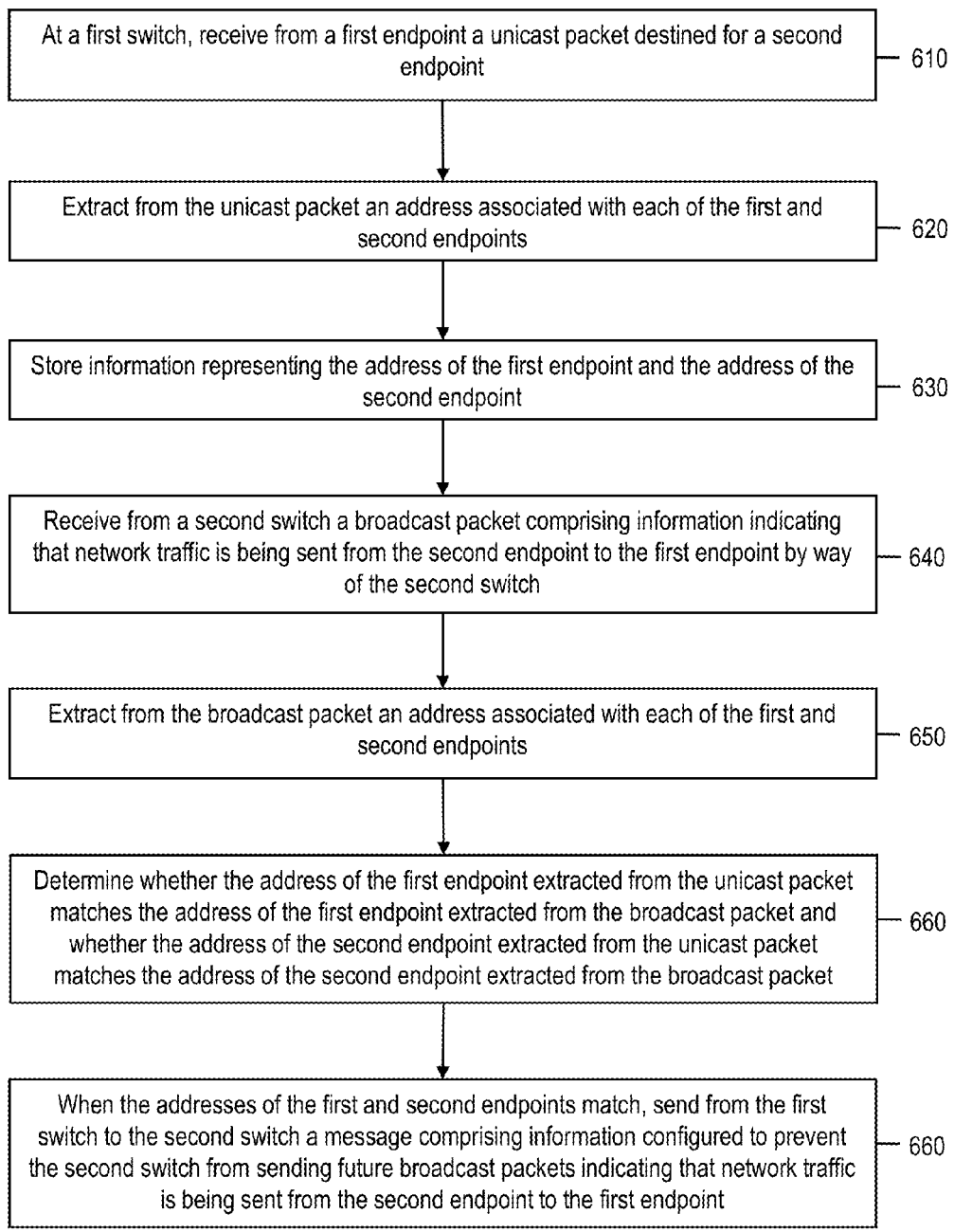
FIG. 6 is an example flowchart depicting a process for preventing peer switch flooding.

Referring to FIG. 6, connection based MAC learning process logic 600 will now be described. At 610, at a first switch, a unicast packet is received from a first endpoint, e.g., endpoint D (along path 180 (FIG. 1), that is destined for a second endpoint, e.g., endpoint B. At 620, an address associated with each of the first and second endpoints is extracted from the unicast packet. At 630, information representing the address of the first endpoint and the address of the second endpoint is stored. At 640, a broadcast or flood packet is received from a second switch, the broadcast packet comprising information indicating that network traffic is being sent from the second endpoint to the first endpoint by way of the second switch, e.g., along path 170 (FIG. 1). At 650, an address associated with each of the first and second endpoints is extracted from the broadcast packet, and at 660, a determination is made as to whether the address of the first endpoint extracted from the unicast packet matches the address of the first endpoint extracted from the broadcast packet and whether the address of the second endpoint extracted from the unicast packet matches the address of the second endpoint extracted from the broadcast packet. At 670, when the addresses of the first and second endpoints match, a message is sent from the first switch to the second switch, the message comprising information configured to prevent the second switch from sending future broadcast packets indicating that network traffic is being sent from the second endpoint to the first endpoint.

The unicast packet source and destination addresses corresponding to the addresses of the first and second endpoints, respectively, may be extracted, e.g., layer 2 MAC addresses. It should be noted that although the above description is made with respect to layer 2 address, other network layer addresses such as layer 3 addresses may be utilized. The source and destination addresses may be stored in a lookup table.

The second endpoint may be coupled to both the first and second switches so that the second endpoint operates as an emulated switch. An emulated switch identifier may be assigned to the second endpoint and the emulated switch identifier may be associated with the address of the second endpoint and storing the emulated switch identifier along with the address of the second endpoint. The message sent may include the address of the first endpoint, the address of the second endpoint, and the emulated switch identifier. The message may only be sent when the second endpoint is coupled to both the first and second switches, e.g., by way of a VPC, otherwise the message is not sent, thereby conserving MAC table processing and memory.

Additional techniques include determining whether the first endpoint or the second endpoint has had a change in network connectivity and a message, e.g., a purge message as described above, is sent from the first switch to the second switch with information configured to allow the second switch to send future broadcast packets indicating that network traffic is being sent from the second endpoint to the first endpoint, e.g., from endpoint B to endpoint D when endpoint D has moved or migrated to another connection point. Generation of the purge message may be implemented in either software or hardware as described above.

An interrupt may be generated by the message sending device and the message may be sent by way of an interrupt service routine. The message may be sent periodically to refresh the MAC addresses from the peer switch. A bit can be set in the source switch to indicate to the source switch to periodically send refresh synchronization packets to the peer switch.

In sum, the DCE environment may employ an emulated switch concept to provide layer 2 multipaths for VPC hosts. Conversational MAC learning is used in the FP edges to keep MAC table entries smaller and scale better. The MACs learned in the primary switch are synchronized to the secondary switch, and vice-versa. This prevents unnecessary flooding and the problems associated therewith.

The above description is intended by way of example only.

What is claimed is:
1. A method comprising:
at a first switch that is a peer switch of a second switch, receiving from a first endpoint a unicast packet destined for a second endpoint;
extracting, at the first switch, from the unicast packet a first source address of the first endpoint and a first destination address of the second endpoint;
storing information, at the first switch, representing the first source address and the first destination address;
receiving, at the first switch, from the second switch a broadcast packet comprising information indicating that network traffic is being sent from the second endpoint to the first endpoint by way of the second switch;
extracting from the broadcast packet a second source address of the second endpoint and a second destination address of the first endpoint;
determining, at the first switch, whether the first source address matches the second destination address and whether the first destination address matches the second source address indicating matched addresses of the first and second endpoints; and when matched addresses are indicated, sending from the first switch to the second switch a message comprising information configured to prevent the second switch from sending future broadcast packets indicating that network traffic is being sent from the second endpoint to the first endpoint.

2. The method of claim 1, wherein storing comprises storing information representing the first source address and the first destination address in a lookup table.

3. The method of claim 1, further comprising coupling the second endpoint to both the first and second switches so that the second endpoint operates as an emulated switch.

4. The method of claim 3, further comprising:
assigning an emulated switch identifier to the second endpoint;
associating the emulated switch identifier with the first destination address of the second endpoint; and
storing the emulated switch identifier along with the first destination address of the second endpoint.

5. The method of claim 4, wherein sending comprises sending the message including the matched addresses of the first and second endpoints, and the emulated switch identifier.

6. The method of claim 3, wherein sending comprises sending the message when the second endpoint is coupled to both the first and second switches, otherwise not sending the message.

7. The method of claim 1, further comprising:
determining whether the first endpoint or the second endpoint has had a change in network connectivity; and
sending from the first switch to the second switch a message comprising information configured to allow the second switch to send future broadcast packets indicating that network traffic is being sent from the second endpoint to the first endpoint.

8. The method of claim 1, further comprising:
generating an interrupt; and
wherein sending comprises sending the message by way of an interrupt service routine.

9. The method of claim 1, wherein sending comprises sending the message periodically.

10. An apparatus comprising:
a network interface device configured to enable communications over a multipath network;
routing circuitry configured to forward packets over the multipath network, including user flow packets from a source switch to a destination switch; and
a processor configured to be coupled to the network interface device and to the routing circuitry, the processor configured to:
receive from a first endpoint a unicast packet destined for a second endpoint;
extract from the unicast packet a first source address of the first endpoint and a first destination address of the second endpoint;
store information representing the first source address and the first destination address;
receive from a peer switch a broadcast packet comprising information indicating that network traffic is being sent from the second endpoint to the first endpoint by way of the peer switch;
extract from the broadcast packet a second source address of the second endpoint and a second destination address of the first endpoint;
determine whether the first source address matches the second destination address and whether the first destination address matches the second source address indicating matched addresses of the first and second endpoints; and
when matched addresses are indicated, send to the peer switch a message comprising information configured to prevent the peer switch from sending future broadcast packets indicating that network traffic is being sent from the second endpoint to the first endpoint.

11. The apparatus of claim 10, wherein the processor is configured to store information representing the first source address and the first destination address in a lookup table.

12. The apparatus of claim 10, wherein the second endpoint is coupled to both the apparatus and the peer switch so that the second endpoint operates as an emulated switch, and wherein the processor is further configured to:
assign an emulated switch identifier to the second endpoint;
associate the emulated switch identifier with the first destination address of the second endpoint; and
store the emulated switch identifier along with the first destination address of the second endpoint.

13. The apparatus of claim 12, wherein the processor is configured to send the message when the second endpoint is coupled to both the apparatus and the peer switch, otherwise not send the message.

14. The apparatus of claim 10, wherein the processor is further configured to:
determine whether the first endpoint or the second endpoint has had a change in network connectivity; and
send to the peer switch a message comprising information configured to allow the switch to send future broadcast packets indicating that network traffic is being sent from the second endpoint to the first endpoint.

15. The apparatus of claim 10, wherein the processor is further configured to:
generate an interrupt; and
send the message by way of an interrupt service routine.

16. One or more non-transitory computer readable storage media storing instructions that, when executed by a processor, cause the processor to:
receive from a first endpoint a unicast packet destined for a second endpoint;
extract from the unicast packet a first source address of the first endpoint and a first destination address of the second endpoint;
store information representing the first source address and the first destination address;
receive from a peer switch a broadcast packet comprising information indicating that network traffic is being sent from the second endpoint to the first endpoint by way of the peer switch;
extract from the broadcast packet a second source address of the second endpoint and a second destination address of the first endpoint;
determine whether the first source address matches the second destination address and whether the first destination address matches the second source address indicating matched addresses of the first and second endpoints; and
when matched addresses are indicated, send to the peer switch a message comprising information configured to prevent the peer switch from sending future broadcast packets indicating that network traffic is being sent from the second endpoint to the first endpoint.

17. The one or more non-transitory computer readable storage media of claim 16, wherein the instructions that are operable to store comprise instructions that are operable to store information representing the first source address and the first destination address in a lookup table.

18. The one or more non-transitory computer readable storage media of claim 16, wherein the second endpoint operates as an emulated switch, and further comprising instructions that are operable to:
- assign an emulated switch identifier to the second endpoint;
- associate the emulated switch identifier with the first destination address of the second endpoint; and
- store the emulated switch identifier along with the first destination address of the second endpoint.

19. The one or more non-transitory computer readable storage media of claim 16, and further comprising instructions that are operable to:
- determine whether the first endpoint or the second endpoint has had a change in network connectivity; and
- send to the peer switch a message comprising information configured to allow the peer switch to send future broadcast packets indicating that network traffic is being sent from the second endpoint to the first endpoint.

20. The one or more non-transitory computer readable storage media of claim 16, and further comprising instructions that are operable to:
- generate an interrupt; and
- send the message by way of an interrupt service routine.

* * * * *